Figure 1:
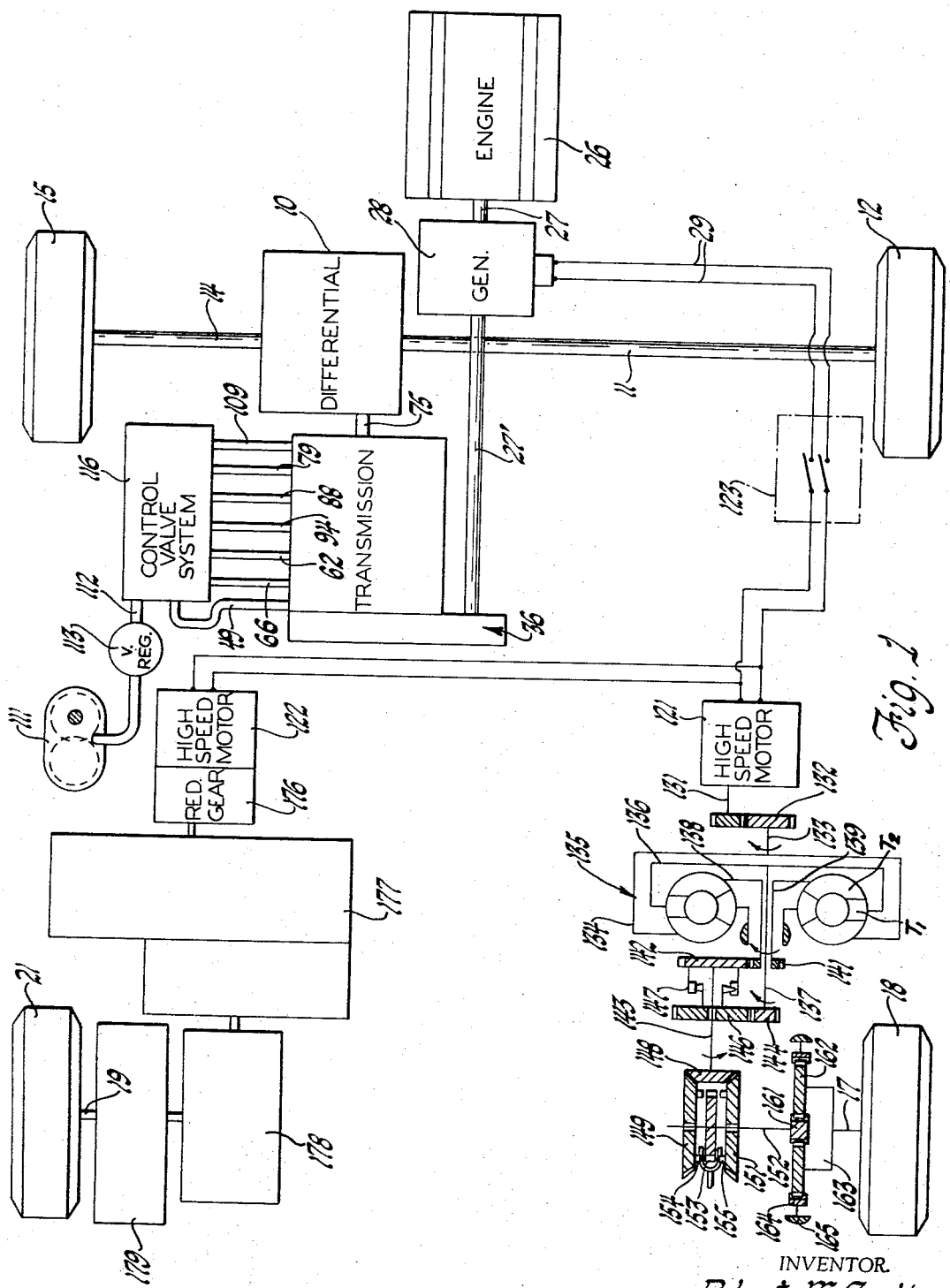

Nov. 14, 1967  R. M. TUCK  3,352,373
VEHICLES WITH PLURAL AXLES AND MEANS TO PROVIDE MAXIMUM
TRACTIVE EFFORT FOR EACH AXLE AT THE SAME SPEED
Filed Dec. 11, 1963  2 Sheets-Sheet 1

INVENTOR.
Robert M. Tuck
BY
A. M. Leiter
ATTORNEY

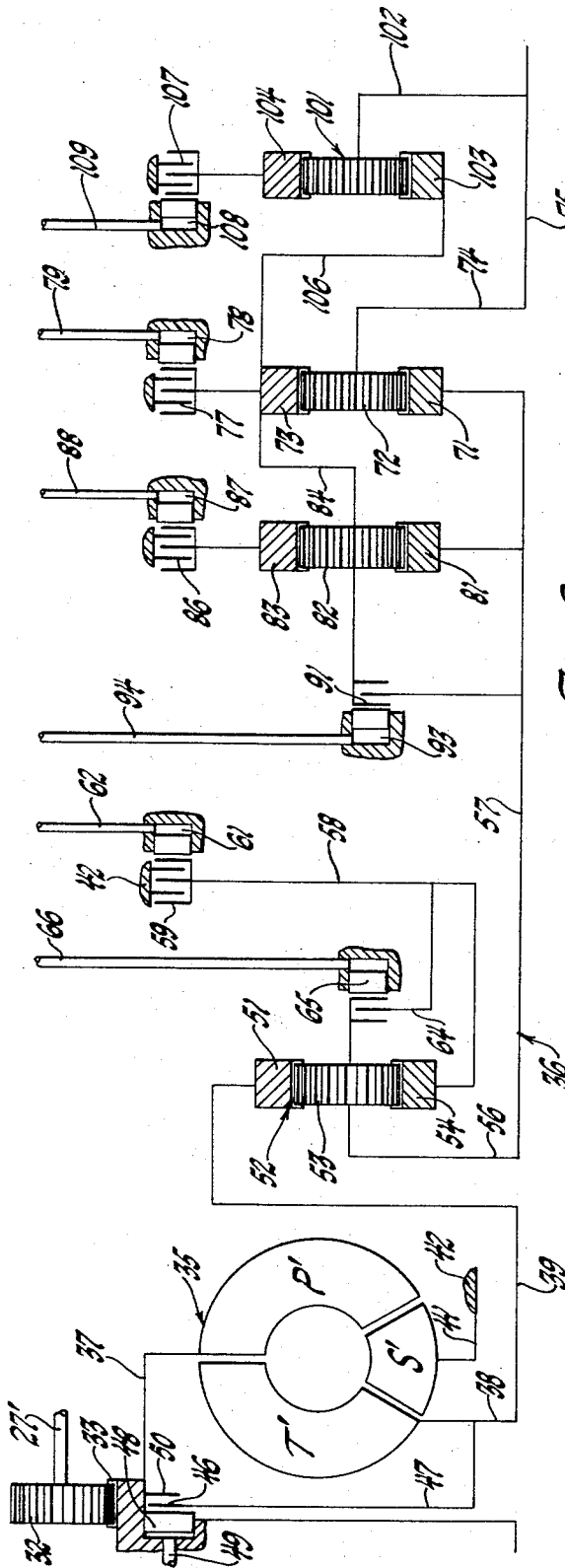

United States Patent Office 3,352,373
Patented Nov. 14, 1967

3,352,373
VEHICLES WITH PLURAL AXLES AND MEANS TO PROVIDE MAXIMUM TRACTIVE EFFORT FOR EACH AXLE AT THE SAME SPEED
Robert M. Tuck, Indianapolis, Ind., assignor to General Motors Corporation, Detroit, Mich., a corporation of Delaware
Filed Dec. 11, 1963, Ser. No. 329,624
15 Claims. (Cl. 180—44)

This invention relates to transmissions and more particularly to a four wheel drive transmission.

In vehicles having multiple driving axles, in order to obtain the maximum tractive effort from the vehicle power plant for driving the vehicle, the torque and power supplied to each axle and its traction devices, i.e. wheels, such as the front axle and wheels and the rear axle and wheels, must be properly divided by the transmission system so that the tractive limit on both the front and the rear wheels is reached at the same speed and load. The maximum tractive effort that each driving axle and its wheels is capable of transmitting under design load and traction conditions is called the tractive limit. This is measured in pounds of tractive effort by the vehicle or foot-pounds of torque that the wheels can use. In accordance with this invention, this result may be accomplished by employing a transmission system to connect a power plant to two axles employing an infinitely variable torque converter in the drive to each driving axle, where each torque converter drive provides the maximum tractive effort of the axle it drives at the same speed. The tractive limit of each axle is generally different. This will require one torque converter driving one axle providing a tractive effort equal to the tractive limit of the one axle and a second torque converter to drive the other axle providing a tractive effort equal to the tractive limit on the other axle when both drives are operating at the same speed. Where there is a substantial difference in the tractive limit, multiple turbine torque converters having higher output torque near stall are advantageously employed to accomplish this result.

An object of this invention is to provide in a transmission having a plurality of outputs, a drive train to each output providing an infinitely variable torque multiplication to each output with torque multiplication range providing the tractive torque limit in the same proportion as the tractive torque limits of the outputs.

Another object of the invention is to provide in a vehicle having a pair of axles, each having a tractive effort limit, an infinitely variable transmission driving each axle with a torque providing the maximum tractive effort for each axle at the same speed.

Another object of the invention is to provide in a vehicle having a forward and a rearward axle different tractive effort limits, a transmission connected to drive each of said axles through an infinitely variable torque converter with the torque converters having a torque and power output providing the maximum tractive effort for each axle at the same speed.

Another object of the invention is to provide in a vehicle having a forward axle having one tractive effort limit and a rearward axle having another tractive limit, a transmission having one infinitely variable torque converter driving the forward axle and providing torque and power at the tractive effort limit at a predetermined driving speed and a second infinitely variable torque converter driving the rear axle providing torque and power at the tractive effort limit at the same predetermined driving speed.

Another object of the invention is to provide in a vehicle having a forward driving axle having one tractive effort limit and a rearward driving axle having a different tractive limit, a transmission to drive said axles having one infinitely variable fluid torque converter having a torque and power output at a predetermined speed equal to the tractive effort limit of the axle it drives at a predetermined speed, and another infinitely variable fluid torque converter driving the other axle having a torque and power output equal to the tractive effort limit of the other axle at the same predetermined speed and a similar proportional relationship between the output of the torque converters through a range of operation.

These and other objects of the invention will be more apparent from the following description of the preferred embodiment of the invention illustrated in the drawing.

FIGURE 1 diagrammatically shows a vehicle a power plant and a four wheel drive transmission.
FIGURE 2 shows a detail of a transmission component.
FIGURE 3 shows operating curves.

The invention is illustrated in a four wheel drive vehicle having a front axle assembly including a differential 10 driving the right drive shaft 11 and wheel 12 and the left drive shaft 14 and wheel 15. The rear axle assembly has a right final output shaft 17 driving the right wheel 18 and a left drive shaft 19 driving the wheel 21. The vehicle has a suitable power plant 26, such as a speed controlled or constant speed internal combustion engine 26, having an output shaft or input shaft 27 for the entire transmission assembly. Shaft 27 drives two power trains. In one power train shaft 27 drives generator 28 which generates an alternating current supplied via the lines 29 to motors as described below.

The engine output or transmission assembly input shaft 27, in the other drive train, has a continuation 27' extending on the other side of the generator which drives (FIG. 2) the spur gear 32 and the input gear 33 of the transmission 36. The transmission 36 includes a torque converter 35 having an input gear 33 mounted on the rotary torque converter housing 37 which drives the torque converter pump P'. As in conventional three element torque converters, the pump P' circulates fluid in the toroidal circuit to drive the turbine T', which is connected by a hub 38 to the torque converter output shaft 39. The stator S' provides reaction in the fluid circuit and is held against backward rotation by a one-way brake (not shown) or fixed by the hub structure 41 to the transmission housing 42.

A lockup clutch directly connects the input housing 37 to the output shaft 39 which consists of a driven plate 46 connected by a hub 47 to the hub 38 and torque converter output shaft 39 and a fluid actuated motor 48 operated on the supply of fluid from line 49 to engage plate 46 with the abutment 50 fixed to housing 37 to engage the lockup clutch. Suitable retraction springs (not shown) and/or a lower pressure in the torque converter housing disengage the lockup clutch.

The converter output shaft 39 drives the ring gear 51 of the splitter gear unit 52. The ring gear 51 meshes with the planetary pinion 53 which in turn mesh with the sun gear 54. Pinions 53 are mounted on a carrier 56 driving intermediate shaft 57. The sun gear 54 is connected by a control hub 58 which may be either connected to the housing 42 by the brake 59 actuated by motor 61 on the supply of fluid thereto via line 62 or locked up for direct drive by the clutch 64 which is engaged when the motor 65 is supplied via line 66 by fluid under pressure.

The intermediate shaft 57 drives the sun gear 71 of the low speed gear set. The sun gear 71 meshes with the planetary pinions 72, which in turn mesh with the ring gear 73. Pinions 72 are mounted on a carrier 74 connected to drive the output shaft 75 which drives differential 10 and the front wheels. The ring gear may be braked by the brake 77 actuated by the motor 78 when fluid is supplied via line 79 to provide low ratio.

The intermediate shaft 57 also drives the sun gear 81 which meshes with pinions 82 which in turn mesh with ring gear 83. The pinions 82 are mounted on a carrier 84 which drives the ring gear 73 of the low ratio gear set. The ring gear 83 is retarded or braked by the reaction brake 86 when actuated by motor 87 on the supply of fluid via the line 88. Actuation of brake 86 to retard ring gear 83 drives the ring gear 73 forward at a slow speed to provide intermediate ratio.

For high ratio the high clutch 91, which connects the intermediate shaft 57 and the carrier 84, is actuated by fluid motor 93 on the supply of fluid via line 94.

Reverse ratio is provided by the reverse gear set which has a plurality of pinions 101 mounted on a carrier 102 connected to drive the output shaft 75. The pinions 101 mesh with the sun gear 103 and the ring gear 104. The sun gear 103 is connected to the ring gear 73 by connector 106. The ring gear 104 is retarded by brake 107 when actuated by motor 108 on the supply of fluid by line 109.

This transmission will provide six forward speeds when the controls are arranged to provide either splitter low or splitter high, a direct drive, in the front or splitter gear unit in conjunction with each of the three forward ratios, low, intermediate and high, also a direct drive, in the rear unit. Normally only splitter low is provided with reverse in the rear unit to provide one reverse drive, but splitter high may also be used with reverse to provide a second reverse drive. The friction clutches and brakes have suitable retraction springs (not shown) and provide friction drive engaging devices.

This transmission is controlled by a suitable control system supplied with fluid under pressure from a suitable sump by an engine or input driven pump 111 which supplies fluid to a main line 112 at a pressure regulated by regulator valve 113. The control valve means provides a suitable control to engage the selected pairs of ratios to provide the six forward ratios and one or two reverse ratios and for selective engagement of the lockup clutch. Suitable control arrangements are shown in the following patents: 3,053,116, Christenson et al.; 2,978,928, Tuck et al.; and Patent No. 3,138,969, Fisher et al. The control valve system 116 provides fluid supply, for first, via lines 62 and 79 to engage splitter low and low in the rear unit, second, via lines 66 and 79 to engage splitter high and low, third, via lines 62 and 88 to engage splitter low and intermediate in the rear unit, fourth, via lines 66 and 88 to engage splitter high and intermediate, fifth, via lines 62 and 94 to engage splitter low and high in the rear unit, sixth, via lines 66 and 94 to engage splitter high and high, and reverse, via lines 62 and 109 to engage splitter low and reverse. In each ratio the lines not supplied with fluid under pressure are exhausted. Fuid is also supplied via line 49 to engage the lockup clutch as the torque converter approaches the coupling phase as explained in the above patents.

The rear wheels are driven by electric motors and torque converter transmission units. The right wheel is driven by a right high speed electric motor 121 and the left wheel 21 by a high speed electric motor 122. The electric power from the generator is connected by the lines 29 which are controlled by control switch 123. Since both the right and the left transmission drive trains from the motors 121 and 122 to the rear wheels are the same, the following description directed to the right drive train also applies to the left drive train. The right electric drive motor 121 drives output shaft 131 which is connected by the reduction gear set 132 to the torque converter input shaft 133 to drive the torque converter housing 134 and the pump P of torque converter 135. The pump in the conventional manner of torque converters circulates fluid in a toroidal path through a first turbine $T_1$, which is connected by a hub 136 to the first turbine output shaft 137. Fluid is also circulated through the second turbine $T_2$ which is connected by a hub 138 to the second turbine output shaft 139. Both turbines rotate in the same direction. The second output shaft 139 is connected by a gear set 141-142 having a small reduction to the final output shaft 143. The first turbine output shaft is connected by a larger reduction gear set consisting of output gear 144 on the first turbine shaft and a driven gear 146 freely rotated coaxially with shaft 143. Gear 146 is connected by a one-way device 147 to the gear 142 to drive the gear 142 and the final output shaft 143 when gear 146 would otherwise rotate faster than gear 142. A more detailed description of this arrangement is shown in Patent No. 3,256,751 of Robert M. Tuck et al., filed Oct. 22, 1962, for "Transmission."

The final torque converter output shaft 143 drives a beveled gear 148, which drives a pair of beveled gears 149 and 151 both freely rotatably mounted on the cross shaft 152. A clutch assembly is provided between the shaft 152 and either of the beveled gears 149 and 151 to selectively clutch the beveled gears to shaft 152 to provide between torque converter output shaft 143 and cross shaft 152 a forward or reverse drive. The clutch assembly has a driven member 153 fixed to the shaft 152 which may be axially moved to engage the dogs 154 on gear 149 or dogs 155 on gear 151. With the direction of the input 133 and output shaft 17 as indicated by the arrows, clutch driven member 153 engages dogs 155 for forward and dogs 154 for reverse.

Shaft 152 drives the sun gear 161 of the planetary reduction gear set. The sun gear 161 meshes with pinions 162 mounted on a carrier 163 which drives the final output shaft 17. The planetary pinions 162 also mesh with a ring gear 164 fixed to the housing 165.

The left motor 122 is connected by similar reduction gears 176, torque converter 177, forward and reverse clutch 178 and reduction gear 179 to left final output shaft 19.

This multiaxle transmission drive assembly includes in the drive to each of the axle assemblies, an infinitely variable torque multiplying transmission providing the maximum torque and power, that each axle assembly and its traction means can use at substantially the same driving speed. Significant relative axle speed would cause slip of one traction means and loss of traction. The engine 26 is connected by one driven train having a multi-ratio transmission 36 including a fluid torque converter 35 to drive the front wheel drive axle assembly and another driving train having an electric generator 28, electric motors 121, 122 and fluid torque converters 135, 177 which provide power to drive the rear wheel axle assembly. At the rear wheels the generated electric power is converted to torque by electric high speed motors 121–122 which drive torque converters 135–177. As shown in FIGURE 3, the torque converters have torque output characteristics as represented by the curve 181 for the front torque converter and curve 182 for the rear drive torque converters when the front transmission is in first ratio plotted as pounds (lbs.) of tractive effort an equivalent of torque against vehicle speed in miles per hour.

The torque converters by infinitely varying the torque ratio and speed ratio are able, within a limited range of variation, to drive both the front and rear wheels at the same traction or driving speed and with a torque within the tractive limits. The torque converters in this way may correct for a difference of as much as 40% in the ratio from the engine to the front and rear wheels.

By properly selecting the two torque converters, the front torque converter 35 and the rear torque converter 135–177, and their connecting drive trains provide torque characteristics, i.e., as shown by curves 181 and 182 of FIG. 3, respectively, so that they provide, in conjunction with the ratio of the drive train from the engine to the front wheels with the transmission in the lowest ratio and the ratio of the drive train from the engine to the rear wheels, torque to the front wheels equal to the front wheel drive tractive limit (FTL) and torque to the rear wheels equal to the rear wheel drive tractive limit (RTL) at the same speed as indicated at the speed ordinate 183. Thus the relation of the torque multiplication characteristics of the front and rear drive trains is a function of the relationship of the front and rear wheel drive tractive limits. Then both front and rear wheels will be driven at maximum load or torque without slip equal to their tractive torque limit. This avoids the loss of power that occurs when the front or the rear wheels slip before the other wheels slip. Thus in drives of this type where the input torque is split between a front torque converter driving the front wheels and a rear torque converter driving the rear wheels, and the rear wheels have a greater tractive limit than the front wheels, the rear torque converter is constructed to provide greater torque particularly at low speeds than the front torque converter so that both torque conveters provide torque equal to the tractive limit of the wheels or other traction devices. In most vehicles one axle will have a higher tractive limit. By driving this axle with a multistage torque converter, such as the twin turbine converter 135 providing typical torque curve 182, higher torque multiplication or torque is obtained as compared to the other axle which is driven by a more conventional three element torque converter providing typical torque curve 181. The input torque split between the converter 35 to drive the front wheels and the generator 28 driving through converter 135–177 to drive the rear wheels is controlled by the characteristics of these converters.

Where the drive trains are such that both torque converters provide the same torque ratio at the point of maximum tractive effort, the torque converters should have a capacity factor $$K = \frac{N}{\sqrt{T}}$$

where N is output r.p.m. and T is output torque proportion to the maximum tractive effort. When the torque ratio of one torque converter is increased relative to the other torque converter, the capacity of the one torque converter should be reduced to obtain the desired proportion of output torques to match the tractive limit of each axle at the same speed. As indicated by curves 181–182, this drive may spin the wheels at maximum power up to about 1 m.p.h. but when both the front and rear wheels simultaneously begin to drive without slip at their respective tractive limits to provide the maximum vehicle drive with the traction devices used. The tractive effort curves 181–182 are also substantially parallel in this range and thus with reductions in the tractive limits due to tire wear or road conditions which would affect both traction limits to a substantially equal degree, the drive would substantially initiate non-slip drive at the reduce tractive limit of each axle at the same time. Thus the infinitely variable torque multiplication should extend over a substantial range at the design tractive limit or range of tractive limits.

In first ratio lockup of front transmission 36 the torque to the front wheels is indicated by curve 184 and to the rear wheels is indicated by curve 185. Similarly in second ratio lockup the torque to the front wheels is shown by curve 186 and to the rear wheels by curve 187. These curves show that in these ratios the torque to the axles is not related to the tractive limits but in this range of operation far below the tractive limits this is immaterial as no slipping will occur at this low tractive effort.

At higher speeds, higher ratios, 4th to 6th, of the transmission 34 are used and the drive to the rear wheels is discontinued by disconnecting switch 123.

This invention may be modified within the scope of the appended claims.

I claim:

1. In a vehicle drive, the combination of a first driving axle means including traction means having a first normal tractive torque limit; a second driving axle means including traction means having a second normal tractive torque limit; said first and second traction means being longitudinally spaced and driving without slip at the same speed, a transmission assembly having an input, first drive train means including a first torque converter having substantially infinitely variable torque multiplication over a substantial range of torque multiplication driven by said input and connected to drive said first driving axle means and providing at a predetermined driving speed of said first driving axle means a torque output substantially equal to the first tractive torque limit, and second drive train means including a second torque converter having substantially infiinitely variable torque multiplication related to the torque multiplication of said first torque converter as a function of the relationship of said second to said first tractive torque limit over a substantial range of torque multiplication driven by said input and connected to drive said second driving axle means and providing substantially at said predetermined driving speed of said second driving axle means a torque output substantially equal to the second tractive torque limit for substantially coextensive non-slip vehicle drive by both traction means in said range of torque multiplication up to said tractive limits of both traction means.

2. In a vehicle; the combination of a first driving axle means including first traction means having a first normal tractive torque limit; a second driving axle means including second traction means having a different second normal tractive torque limit; a transmission assembly having an input, first drive train means including a first torque converter having substantially infinitely variable torque multiplication over a substantial range of torque multiplication driven by said input and connected to drive said first driving axle means and providing at a predetermined driving speed of said first driving axle means a torque output substantially equal to the first tractive torque limit, and second drive train means including a second torque converter having substantially infinitely variable torque multiplication related to the torque multiplication of said first torque converter as a function of the relationship of said second to said first tractive torque limit over a substantial range of torque multiplication driven by said input and connected to drive said second driving axle means and providing substantially at said predetermined driving speed of said second driving axle means a torque output substantially equal to the second tractive torque limit for substantially coextensive non-slip vehicle drive by both traction means in said range of torque multiplication up to said tractive limits of both traction means.

3. The invention defined in claim 2 and said drive means being hydrodynamic torque converter drive.

4. The invention defined in claim 2 and said substantial range of torque multiplication of both said torque converters extending over the range of speeds providing drive at the tractive torque limits.

5. The invention defined in claim 2 and one drive train means including a plural ratio gear unit between the torque converter and the driving axle means and the other drive train means including disconnect means to establish and disestablish the drive in said other drive train means and control means for operating said gear unit in a low speed ratio and said disconnect means for establishing the drive during operation in said range of torque multiplication and for operating said gear unit in a high speed ratio and said disconnect means for disestablishing the drive in a lower range of torque multiplication.

6. In a vehicle; the combination of a first driving axle means including tractive means having a first normal tractive torque limit; a second driving axle means including tractive means having a higher second normal tractive torque limit, a transmission assembly having an input and including a first and second drive train means; said first drive train means including a first fluid dynamic torque converter driven by said input and connected to drive said first driving axle means and having torque multiplication in a substantial range providing at a predetermined driving speed of said first driving axle means a torque output substantially equal to the first tractive torque limit; said second drive train means including a second fluid dynamic torque converter driven by said input and connected to drive said second driving axle means and having torque multiplication in a substantial range related to the torque multiplication of said first drive train as a function of the relationship of said second to said first tractive torque limit and providing substantially at said predetermined driving speed of said second driving axle means a torque output substantially equal to the second tractive torque limit for substantially coextensive non-slip vehicle drive by both traction means in a range of torque multiplication up to said tractive limits of both traction means.

7. The invention defined in claim 6 and said substantial range of torque multiplication of both said torque converters extending over the range of speeds providing drive at the tractive torque limits.

8. The invention defined in claim 6 and one drive train means including a plural ratio gear unit between the torque converter and the driving axle means and the other drive train means including disconnect means to establish and disestablish the drive in said other drive train means and control means for operating said gear unit in a low speed ratio and said disconnect means for establishing the drive during operation in said range of torque multiplication and for operating said gear unit in a high speed ratio and said disconnect means for disestablishing the drive in a lower range of torque multiplication.

9. The invention defined in claim 6 and one torque converter being a multiturbine hydrodynamic torque converter.

10. In a vehicle; the combination of a first driving axle means including traction means having a first normal tractive torque limit; a second driving axle means including traction means having a second different normal tractive torque limit; a transmission assembly having an input, said assembly including first drive means providing infinitely variable torque multiplication over a substantial range of torque multiplication values driven by said input and connected to drive said first driving axle means and providing at a predetermined driving speed of said first driving axle means a torque output substantially equal to the first tractive torque limit, and second drive means providing infinitely variable torque multiplication over a substantial range of torque multiplication values driven by said input and connected to drive said second driving axle means and having torque multiplication related to the torque multiplication of said first drive train as a function of the relationship of said second to said first tractive torque limit and providing at substantially the same predetermined driving speed of said second driving axle means a torque output substantially equal to the second tractive torque limit.

11. The invention defined in claim 10 and said drive means being hydrodynamic torque converter drive.

12. The invention defined in claim 10 and said substantial range of torque multiplication of both said drive means extending over the range of speeds providing drive at the tractive torque limits.

13. The invention defined in claim 10 and one drive means including a torque converter and a plural ratio gear unit between the torque converter and the driving axle means and the other drive means including disconnect means to establish and disestablish the drive in said other drive means and control means for operating said gear unit in a low speed ratio and said disconnect means for establishing the drive during operation in said range of torque multiplication and for operating said gear unit in a high speed ratio and said disconnect means for disestablishing the drive in a lower range of torque multiplication.

14. In a vehicle; a plurality of longitudinal spaced driving axle means each having traction means subjected to different normal tractive torque limits while propelling the vehicle without slip at the same speed; a prime mover means including a driving member, a plurality of drive train means corresponding to said traction means, said driving member being operatively connected to drive each of said drive train means for driving the corresponding traction means, each said drive train means including infinitely varying torque multiplying and apportioning means having a relation which is a function of the relation between said tractive torque limits for inifinitely varying the torque multplication and apportioning the torque to each of said traction means in a substantial range of operation in relation to their normal tractive torque limits and to drive each of said traction means at substantially the same driving speed for substanitally coextensive non-slip vehicle drive of the plurality of traction means in said substantial range of operation up to said tractive torque limits.

15. The invention defined in claim 14 and one drive train means including a torque converter and a plural ratio gear unit between the torque converter and the driving axle means and another drive train means including disconnect means to establish and disestablish the drive in said another drive train means and control means for operating said gear unit in a low speed ratio and said disconnect means for establishing the drive during operation in said range of torque multiplication and for operating said gear unit in a high speed ratio and said disconnect means for disestablishing the drive in a lower range of torque multiplication.

References Cited

UNITED STATES PATENTS

| 2,768,538 | 10/1956 | Simonds. |
| 2,962,916 | 12/1960 | Koelsch. |
| 3,170,534 | 2/1965 | Kelley et al. _____ 180—73 |

FOREIGN PATENTS

| 840,494 | 7/1950 | Great Britain. |

A. HARRY LEVY, *Primary Examiner.*